EFFECT OF BORAX AND VEGETABLE OIL ON VOLATILIZATION LOSSES — 4 DAYS

EFFECT OF BORAX AND PLASTIC ON VOLATILIZATION LOSSES — 4 DAYS 3,565,599
UREASE INHIBITED UREA-CONTAINING COMPOSITIONS

Kamil M. Sor, Fanwood, and John A. Pelissier, Metuchen, N.J., and Ross Latham, Jr., Adrian, Mich., assignors to Esso Research and Engineering Company, a corporation of Delaware
Continuation-in-part of application Ser. No. 601,536, Dec. 14, 1966. This application May 5, 1969, Ser. No. 821,638
Int. Cl. C05c 9/00
U.S. Cl. 71—28                             2 Claims

ABSTRACT OF THE DISCLOSURE

Urea-containing fertilizers comprising a boron-containing urease inhibitor are improved in regard to urease inhibitive properties by the addition thereto of various compounds generally exhibiting hydrophobic characteristics, e.g., organic acids, esters and amides; hydrocarbons such as white oils; long chain amines; vegetaable oils; organosilicones; plastic polymers and resins; etc. This addition results in increased inhibition against the rapid volatilization of ammonia therefrom when the fertilizers are surface-applied to soil.

CROSS-REFERENCE TO OTHER APPLICATIONS

Figure 1:
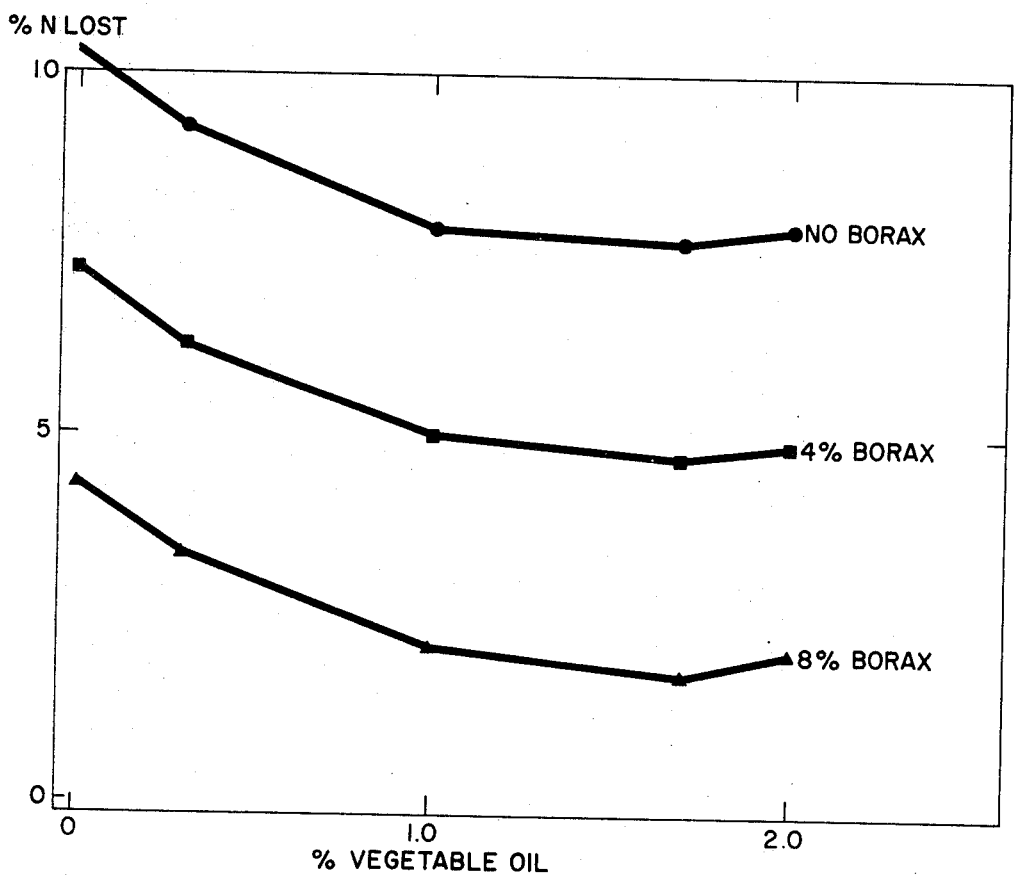

This application is a continuation-in-part of Kamil M. Sor et al. copending U.S. patent application Ser. No. 601,536, filed Dec. 14, 1966, (now abandoned) and entitled "Fertilizer Composition."

FIELD OF THE INVENTION

This invention relates to an improved urea-containing fertilizer that is inhibited against the rapid volatilization of ammonia therefrom. More particularly, this invention relates to an improved urease-inhibited urea-containing fertilizer, preferably comprising a boron-containing urease inhibitor and a hydrophobic chemical.

PRIOR ART

It is well known in the art to use urea and urea compounds as agricultural nutrients. However, the effective life of such nutrients is of short duration wherever general microbiological activity exists in the soil to which the nutrient is applied. This is due to the fact that when urea is placed onto the surface of moist soils which contain urease, the urea is hydrolyzed. Urease, a crystallizable enzyme, occurring in numerous bacteria and fungi, catalyzes the conversion of urea into ammonium carbonate, which subseqeuntly decomposes into ammonium bicarbonate and ammonia in accordance with the following equations:

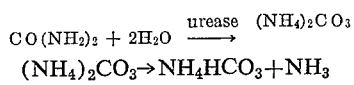

$$(NH_4)_2CO_3 \rightarrow NH_4HCO_3 + NH_3$$

A major portion of the ammonia thus formed is held by the absorbing constituents of the soil, and the rest may be lost to the air. In some cases, the ammonia loss can be as high as 50% of the applied nitrogen. In order to overcome this nitrogen loss, many suggestions for reducing the rate of ammonia loss have been made. For example, Gaylord Volk of the Florida Agricultural Experiment Station, in "Agricultural and Food Chemistry," Vol. 9, No. 4, pages 280–283, 1961, suggested the use of copper sulfate to inhibit the action of urease by applying said copper sulfate to the soil prior to the application of the nutrients; however, the result of Volk's tests indicated that significant inhibition of the urea hydrolysis appeared to be impractical by his suggested method.

Other attempts have been made to solve this problem economically. One proposed solution, for example, consisted of mixing a urease inhibitor with urea pellets, incorporating therein microcrystalline wax and asphalt as a binder, and pelletizing the whole of such materials as a means by which to retard action of the urease enzyme and thereby reduce the volatilization of ammonia. However, this solution is a relatively expensive procedure and is therefore unattractive for many commercial purposes.

It has now been discovered that effective retardation in urea hydrolysis can be obtained by combining urea or a urea-containing fertilizer and borax with a hydrophobic chemical.

SUMMARY OF THE INVENTION

In accordance with the present invention, therefore, hydrophobic chemicals are incorporated into urea fertilizers, especially those containing urease inhibitors, preferably comprising a boron-containing compound, which inhibit or reduce the rate of volatilization of ammonia. By the term "boron-containing compounds" is meant inorganic boron compounds having a water solubility of .1 gram per 100 grams of water, or greater, at 0° C., including as non-limiting examples sodium tetraborates, i.e., "borax," sodium perborates, potassium metaborates, potassium tetraborates, potassium peroxyborate, potassium fluoroborate, calcium metaborates, orthoboric acid, ammonium pentaborate, ammonium tetraborate, tetraboric acid, etc. By the terminology "urease inhibitors" is meant a material which inactivates the urease enzyme itself or delays or stops its production. Although the function of the hydrophobic chemical is not fully understood, it is nevertheless believed that such hydrophobic chemicals reduce the rate of dissolution of urea in soils and thus keep the inhibitor in close contact with urea for an extended period.

The hydrophobic chemicals which can be used for the purposes of this inevntion are:

Those organic compounds considered nonpolar and practically water insoluble, as for example, petroleum hydrocarbons such as oils, e.g. lubricating oils, white oils, and petrolatums; as waxes, e.g., greases, Vaseline, paraffin waxes, microcrystalline waxes, asphalts; and light petroleum fractions, e.g., naphtha, gasoline, kerosene and gas oil.

The foregoing types of hydrophobic chemicals can be further classified into a number of subclasifications including for example: (1) organic acids, esters and amides containing a hydrocarbon chain of 8 or more carbon atoms; (2) polyhydroxylated and polyalkoxylated alcohols and ethers containing a carbon chain of 8 or more carbon atoms; (3) long chain amines containing a hydrocarbon chain or 8 or more hydrocarbon atoms; (4) petroleum oil hydrocarbons such as oils, waxes, kerosene, etc., (5) organosilicones, (6) vegetable oils; and (7) plastic coatings.

Nonlimiting representative examples illustrative of the foregoing subclasses include:

(1) Organic acids, esters and amides consisting of a hydrocarbon chain of 8 or more carbon atoms Long chain fatty acids, phosphonates, thiophosphonates, persulfates, thiosulfates, sulfonamides, sulfonic acids, sulfonated amides, petroleum sulfonates, sulfonated fatty acids, alkyl sulfonates, aryl sulfonates, sulfonated oils, fatty esters, alkoxylated fatty esters, glycol esters, sulfated fatty esters, alkanolamides, alkoxylated amides, etc.

(2) Polyhydroxylated and polyalkoxylated alcohols and ethers containing a carbon chain of 8 or more carbon atoms Alkylpolyoxy ethylene, fatty alcohols, polyglycolethers, alkylpolyglycolethers, ethoxylated phenols, polyoxyethylated fatty alcohols, polyoxyethylated resinous aromatic alcohols, polyoxyethylated alkylamines, etc.

(3) Long chain amines consisting of a hydrocarbon chain of 8 or more carbon atoms Octylamine, decylamine, octadecylamine, hexadecylamine, dodecylamine, etc., preferably those having a carbon atom content of $C_8$ to $C_{18}$.

(4) Petroleum hydrocarbons (a) Oils.—Lubricating oils, white oils and petrolatums, spray oils, etc., generally having a boiling point of over 300° C. and a carbon-hydrogen content generally in the range of $C_{16}H_{34}$—$C_{20}$—$H_{42}$.

(b) Waxes—low volatile petroleum fractions.—Greases, vaseline, paraffin waxes, microcrystalline waxes, asphalts, generally having a carbon-hydrogen content of approximately $C_{18}H_{38}$ to $C_{24}H_{50}$.

(c) Light petroleum fractions.—Naphtha, gasoline, kerosene, gas oil, etc.

(5) Organosilicones

Alkylsilicones, alkylsiliconediols, alkylethoxysilane polymers, etc., i.e. those compounds of silicon which contain carbon of such a character as to impart organic properties to the molecule.

(6) Fats and oils

Soy bean oil, corn oil, olive oil, cottonseed oil, sesame oil, castor oil, palm oil, beeftallow, etc., generally classified as fixed oils (fatty substances of vegetable and animal origin that contain esters of fatty acids).

(7) Plastic coatings

Polyethylene, polypropylene, acrylic compounds, vinyl resins, etc., i.e. those substances which can be shaped when soft and hardened afterwards.

Thus, the present invention contemplates the use of those compounds which can be considered totally hydrophobic in character as nonpolar, and those compounds which while exhibiting polarity by containing therein a polarizing group, are such as to exhibit an effect substantially hydrophobic in character due to balancing and/or overriding of the polar portions of the molecule by the nonpolar portion. Preferred embodiments of the hydrophobic substances are a microcrystalline wax having a melting point of 160° F. and a viscosity of 211 cs. at 210° F. and 33.8 cs. at 180° F., an oleyl ester of polyethyleneglycol, N-tallow trimethylene diamine, calcium petroleum sulfonate, a naphthenic spray oil having a viscosity of 70 S.U.S. at 100° F., olive oil, octadecylamine and dimethyl polysiloxane.

It has surprisingly been found that the effectiveness of boron-containing compounds, such as borates (e.g., borax, a hydrated sodium borate salt), boric acid, boric acids, combinations thereof, etc., as urease inhibitors can be remarkably improved if used in combination with one or more of the aforementioned hydrophobic chemicals. Unexpectedly, other urease inhibitors such as heavy metal ions, such as the ions of copper, cobalt, silver, mercury, manganese, zinc, cadmium, nickel and lead, etc.; fluorides, halogens and cyanides such as sodium fluoride, sodium iodide, sodium bromides and sodium cyanide; sulfuric acids and quinones; aldehydes such as formaldehyde; urea derivatives including the methyl, ethyl, and thioforms of urea; alkyl and dialkyl dithiocarbamates; organic and inorganic acids such as boric acid; biocides such as phenol compounds; pyridine compounds, and carbamates and other urease inhibitors known to the art, are not so enhanced by combination with such hydrophobic chemicals.

The preferred agricultural compositions of this invention comprise urea, at least one urease inhibitor, preferably a boron-containing compound and at least one hydrophobic chemical, preferably an oil. The urease inhibitor is incorporated into the composition in amounts of from 0.01 to 25.0 wt. percent based upon the weight of urea. The preferred concentration is in the range of from about 0.1 to about 10.0 wt. percent; and, most preferably, it is employed in an amount in a range of from about 4.0 to 8.0 wt. percent based upon the weight of urea.

The hydrophobic chemical is incorporated into the composition in an amount of from about 0.1 to about 10 wt. percent, preferably from about 0.1 to about 3.0 wt. percent, based upon the weight of urea. Other materials can be combined with urea to produce N-P-K complex fertilizers without departing from the scope of this invention. Such materials include, for example, ammonium phosphates and sulfates, potash or other potassium salts, and normal and triple superphosphates. It is preferred, however, that these complex fertilizers contain a major amount of urea.

It is preferred that the fertilizer compositions of this invention be prepared in the form of pellets, such pellets, as referred to herein, being defined to include any granular, prill, or particle which is suitable for application of the fertilizer to a suitable given environment. The pellet can be formed in any conventional manner known to those skilled in the art. For example, a preferred, commercially known process that would be suitable for forming the pellets of this invention would be prilling.

The hydrophobic chemicals and the urease inhibitors can be added to urea at one or more of the following stages:

(1) during crystallization;
(2) prior to prilling by incorporation into the molten urea;
(3) during the prilling process;
(4) during the coating of prills, preferably at elevated temperatures below 132° C. or
(5) during the coating of prills with anti-caking agents.

The hydrophobic chemicals can be added as such or as ingredients of organic and inorganic coating agents, such as clays, plastics, or polymer coats, which are generally used to improve the handling and/or the nutrient release properties of fertilizers.

The preferred method of incorporating the urease inhibitor and the hydrophobic chemical into the fertilizer composition is to first incorporate the urease inhibitor or inhibitors into the urea by admixing the same in a melt prior to prilling as described in copending application Ser. No. 543,792, filed Apr. 20, 1966 (now abandoned). The urease inhibitor-urea melt is prilled and the prills are subsequently coated with a hydrophobic chemical, such as, e.g., octadecylamine. Alternatively, the urease inhibitor and the hydrophobic chemical can both be added to the urea melt prior to prilling or both may be added as a coating to the urea prill.

Since one molecule of urease can promote the hydrolysis of almost 500,000 molecules of urea per minute at optimum conditions, urea hydrolysis in soil is rapid even at low enzyme concentrations and less than optimum conditions. Moreover, the enzyme often finds nearly optimum conditions in the soil because maximum reaction velocity occurs at a pH of about 7 to 8 and the optimum temperature is about 55° C. In addition, the temperature coefficient of the reaction is approximately 2; therefore the rate of reaction nearly doubles with every rise in temperature of 10° C., within the range of temperatures of about 10° to about 55° C. The inhibitors and hydrophobic chemicals of this invention do not significantly reduce the total amount of ammonia that is formed in the urea but when used together in combination do, however, significantly reduce the rate at which ammonia is volatilized. In this regard, it should be noted that it would be undesirable to prevent completely the hydrolysis of urea, essentially because such hydrolysis is helpful for the fertilizer to work in the soil. However, the essential situation to be avoided is the overly rapid rate of hydrolysis; for when the rate of hydrolysis is reduced, the amount of ammonia that is lost to the air is significantly reduced, thereby resulting in greater yields per unit of applied fertilizer.

The results obtained from laboratory experiments and field tests indicate that incorporation of small amounts of urease inhibitors, preferably a boron-containing material such as borax, especially in combination with a hydrophobic chemical such as octadecylamine, white oils, etc., into urea before prilling reduces the rate of ammonia loss from surface-applied urea. The results also indicate that the reduction thus obtained is more than the reduction obtained by the use of a urease inhibitor such as borax alone. A response curve indicating this synergistic effect for the combination vegetable oil-borax is illustrated in FIG. 1.

The present invention is further illustrated by the following examples, but it is to be understood that the scope of this invention is not limited by the specific temperatures, quantities used, test durations, etc., and other test conditions employed. All measures of viscosity set forth hereinbelow and in the claims are expressed either as cs. (centistokes) or S.U.S. (Saybolt Universal Seconds) units.

EXAMPLE 1

Studies were conducted to determine the rate at which ammonia volatilized from various urea containing fertilizers. Soil having a moisture content of 75% of field capacity was packed into an air tight Lucite cylinder. The fertilizers disclosed in Table I, which were prepared from a melt that was then broken into granules, were then each placed upon the surface of a soil sample in an amount of 0.500 gram per kilogram of soil in Test I and 1.000 gram per kilogram of soil in Test II. Air at a rate of about 20 milliliters per minute was then passed into the Lucite cylinder, over the oil, and into a container of sulfuric acid. The ammonia that was picked up by the air was neutralized by the sulfuric acid and periodically the acid was titrated with sodium hydroxide solution to determine the amount of ammonia that had been removed from the cylinder.

TABLE I

| Days | Cumulative, percent NH₃ lost [1][2] | | | |
|---|---|---|---|---|
| | Test I | | Test II | |
| | 4 | 11 | 4 | 11 |
| Urea materials:[3] | | | | |
| Urea prills | 4.1 | 5.1 | 6.8 | 9.8 |
| Urea plus 4% borax | 1.0 | 3.2 | | |
| Urea plus 4% borax plus 0.5% ODA | 0.1 | 1.7 | | |
| Urea plus 4% borax plus 0.1% ODA | | | 1.1 | 4.8 |
| Urea plus 1.0% ODA | | | 4.5 | 7.5 |

[1] Amount of urea used in these tests was—Test I: 0.500 g./kg. soil; Test II: 1.000 g./kg. soil.
[2] Soil used was a loamy sand, had a pH of 6.4, a cation exchange capacity of 4.0 meq./100g., and a moisture content of 75% of field capacity.
[3] Borax (Na₂B₄O₇·10H₂O) and ODA (octadecylamine) a hydrophobic compound were added to urea at 132° C.

The results in Table I indicate that borax in combination with octadecylamine was more effective in reducing the rate of ammonia loss from urea than borax alone. It is believed that octadecylamine, due to its hydrophobic nature, reduces the diffusion of moisture to and from urea prills thereby keeping borax and urea in close contact for an extensive period and reducing the production and the activity of urease enzyme in the immediate vicinity of the urea. Octadecylamine as used alone was only slightly effective in reducing the ammonia loss of surface-applied urea.

EXAMPLE 2

Further volatilization studies were performed using commercially prepared urea prills. The laboratory volatilization tests were the same as those described in Example 1. Soil used was a loamy sand with a pH of about 6.4, a cation exchange capacity of 4.0 meq./100 g. of soil and an initial moisture content of 65–75% of field capacity. In Table II the laboratory results obtained with commercially prepared urea prills are presented.

TABLE II.—LABORATORY VOLATILIZATION LOSSES OF COMMERCIALLY PREPARED INHIBITOR TREATED UREA PRILLS

| Days | Relative amount of NH₃ loss [1] | | | |
|---|---|---|---|---|
| | 3 | 7 | 10 | 14 |
| Materials:[2] | | | | |
| Urea, untreated | 100 | 100 | 100 | 100 |
| Urea plus 4% borax | 9.0 | 47.9 | 79.5 | 90.0 |
| Urea plus 4% borax plus 1% ODA | 6.0 | 42.1 | 59.7 | 64.8 |

[1] Average of duplicates.
[2] Prills made by Prilling Engineering Co., Denver, Colorado—Borax: Na₂B₄O₇·10H₂O; OAD: Octadecylamine=CH₃(CH₂)₁₇NH₂.

In general, the volatilization results obtained with the commercially prepared prills were similar to the results obtained with the urea materials prepared in the laboratory (See Example 1). The treatment of the urea with both borax and octadecylamine again proved to be much more effective, especially during the second week of the test, than the treatment with borax alone.

EXAMPLE 3

Volatilization tests were performed to determine the effect of concentration of octadecylamine used in combination with borax on the rate of volatilization of ammonia from surface-applied urea. The tests were conducted in the same manner as disclosed in Example 1. The results, as shown in Table III, indicate that a concentration of 0.25% octadecylamine was considerably less effective than the other levels studied. Although the rate of loss tends to decrease as the amount of octadecylamine is increased the differences between the rate at different concentrations were slight. The one treatment that seemed to have the best effect was the coating of commercially prepared prills with 2% octadecylamine. It thus appears that the application of octadecylamine as a coat on prills is slightly more effective in reducing the rate of loss of ammonia than mixing the octadecylamine into molten urea before prilling. The results indicate that 0.5% octadecylamine is as effective as 1% in reducing the rate of loss. However, it is believed that the amount of octadecylamine needed may change with the concentration of borax used in the urea.

TABLE III.—EFFECT OF THE AMOUNT OF OCTADECYLAMINE ON THE VOLATILIZATION LOSS OF BORAX TREATED UREA PRILLS

| Days | 4 | 7 | 11 | 15 |
|---|---|---|---|---|
| Urea prills, untreated [1] | 100 | 100 | 100 | 100 |
| Urea plus 4% borax plus 0.25% ODA [2] | 26.7 | 76.9 | 78.0 | 79.3 |
| Urea plus 4% borax plus 0.5% ODA [2] | 11.8 | 67.4 | 71.7 | 71.8 |
| Urea plus 4% borax plus 1.0% ODA [2] | 14.3 | 65.9 | 71.2 | 71.8 |
| Urea plus 4% borax plus 2.0% ODA [2] | 15.4 | 61.4 | 64.0 | 62.7 |
| Urea plus 4% borax plus 2.0% ODA coated [3] | 4.5 | 48.7 | 57.5 | 57.5 |
| Urea plus 4% borax plus 3.0% ODA [2] | 4.5 | 56.8 | 63.2 | 62.0 |

[1] Prills made in a commercial plant.
[2] Materials prepared in the laboratory by mixing ODA in urea at 132° C.
[3] Commercially prepared prills were coated with ODA at 100° C.

EXAMPLE 4

Field tests were performed to study the effectiveness of treating urea with a borax inhibitor and a hydrophobic chemical. In the tests, urea pellets were made by a commercial prilling process and borax and octadecylamine were mixed into the pellets. The test crop was a tall fescue grass. The urea fertilizer was applied at a rate of 100 pounds of nitrogen per acre, and the results in Tables IV and V are the average of four replicates. The soil used was a loamy sand with a cation exchange capacity of about 5 meg./100 grams of soil. The pH of the soil was adjusted to 7.0 by the use of calcium carbonate and magnesium carbonate. During the first two weeks after the application of the nitrogen materials the moisture of the soil was maintained at 75% of field capacity by the use of plastic covers placed one foot above the soil surface. The results of these tests are shown in Tables IV and V.

TABLE IV.—EFFICIENCY OF NITROGEN SOURCES APPLIED ON SOIL SURFACE UNDER FIELD CONDITIONS
(Tall Fescue Grass-New Jersey)

| Materials | Green | Dry |
|---|---|---|
| No nitrogen | 402.5 | 151.1 |
| Urea prills, untreated | 887.6 | 240.0 |
| Urea plus 4% borax prills | 982.1 | 234.0 |
| Urea plus 4% borax plus 1% ODA prills | 1,382.2 | 352.5 |

The total green and dry weights of the first two clippings indicate that the borax plus ODA-treated urea is considerably more effective than the urea treated only with borax. The reason for this high efficiency is believed to be due to the reduction of the ammonia volatilization loss by the combined effect of borax and octadecylamine.

TABLE V.—EFFECT OF BORAX AND OCTADECYLAMINE TREATMENTS ON THE EFFICIENCY OF SURFACE APPLIED UREA; IN REDUCING THE VOLATILIZATION LOSS

| | Weight of grass, gm./24.5 sq. ft. | |
|---|---|---|
| Materials | Green | Dry |
| No nitrogen | 261.0 | 103.8 |
| Urea, untreated | 578.8 | 140.0 |
| Urea plus 4% borax | 685.8 | 135.0 |
| Urea plus 4% borax plus 4% ODA | 982.5 | 220.0 |

The results of the field test data presented in Table V show that the borax-ODA-urea treatment was more efficient than urea and borax-urea treatments. In the field, borax and ODA used alone did not have significant effect on the crop response.

EXAMPLE 5

Example 5 below illustrates results of tests conducted in accordance with the procedure of Example 1 wherein there were employed a variety of hydrophobic chemicals combined with borax; silicone, vegetable oil, aromatic and naphthenic oils with varying degrees of saturation. All combinations were effective in reducing volatilization. The spray oil Orchex 792 was quite effective in both tests. These results provide further evidence of the efficiency of the combination: hydrophobic chemical plus borax and are presented in Tables VI–VIII below.

TABLE VI.—EFFECT OF VARIOUS COMBINATIONS OF OIL (MARCOL) AND BORAX ON AMMONIA LOSSES

| Percent additive to urea | | Percent N volatilized | | |
|---|---|---|---|---|
| Oil | Borax | 3 days | 7 days | Total |
| 0 | 0 | .81 | 3.16 | 3.97 |
| Marcol 1 [1] | 0 | 1.14 | 4.82 | 5.96 |
| 0 | 2 | .30 | 1.31 | 1.61 |
| Marcol 0.5 | 1 | .40 | 2.65 | 3.05 |
| Do | 3 | .18 | .59 | .77 |
| Marcol 1 | 2 | .47 | 1.81 | 2.28 |
| Do | 4 | .60 | 1.08 | 1.68 |
| Marcol 1.5 | 3 | .12 | .78 | .90 |
| Marcol 2 | 2 | .30 | 1.51 | 1.81 |
| Orchex 1 [2] | 4 | .28 | .63 | .91 |
| Necton 1 [3] | 4 | .30 | 1.32 | 1.62 |

[1] Marcol 72=White oil, a national formulary grade white oil, mixed naphthenic/paraffinic based, viscosity 72 SUS at 100° F., 36 SUS at 210° F., specific gravity of .859 at 77° F.
[2] Orchex 792=Spray Oil C, a naphthenic spray oil, viscosity to 70 SUS at 100° F., minimum U.R. of 52.
[3] Necton 37=Foxam 40, a straight paraffinic process oil, viscosity 113 SUS at 110° F., 40 SUS at 210° F.

TABLE VII.—EFFECT OF OILS AND INHIBITORS ON AMMONIA LOSS

| Percent additive to urea | | Percent N volatized (3 days) |
|---|---|---|
| 1 | 4% borax 1% Marcol | 1.96 |
| 2 | 4% CuSO$_4$ do | 6.08 |
| 3 | 4% NH$_4$F do | 3.85 |
| 4 | 4% thiourea do | 1.90 |
| 5 | 0 do | 2.65 |
| 6 | 2% borax, 2% formaldehyde do | 1.28 |
| 7 | 0 do | 3.08 |

TABLE VIII.—EFFECT OF OTHER INHIBITORS AND COMBINATIONS THEREOF ON AMMONIA USES

| Percent additive to urea | | Percent N volatilized (3 days) |
|---|---|---|
| 4% borax | 1% acetaldehyde | 1.13 |
| Do | 1% tolualdehyde | .54 |
| Do | 4% naphthaldehyde | .48 |
| 4% CuSO$_4$ | 1% formaldehyde, pH 1.0 | 3.07 |
| 1% formaldehyde | 1% ODA | 3.93 |
| 4% borax | 1% silicone [1] | .33 |
| Do | 1% Olive oil [2] | .73 |
| 2% H$_3$PO$_4$ | | 4.41 |
| 2% H$_3$PO$_4$ | 1% ODA | 4.53 |
| 0 | 0 | 4.95 |

[1] Silicone SF-96 (350) sold by General Electirc.
[2] Commercial unadulterated olive oil.

TABLE IX.—EFFECT OF ADDITIONAL HYDROPHOBIC CHEMICALS AND INHIBITORS ON AMMONIA LOSS

| Run No. | Percent additive to urea | Percent N volatilized (4 days) |
|---|---|---|
| 1 | None | 6.76 |
| | 4% CuSO$_4$.5H$_2$O plus 1% ODA | 6.45 |
| | 4% borax plus 1% ODA | 1.05 |
| 2 | None | 5.88 |
| | 2% NH$_4$F plus 1% ODA | 5.54 |
| | 2% CuSO$_4$ plus 1% ODA | 4.52 |
| 3 | None | 7.60 |
| | 4% borax plus 1% ODA | 1.24 |
| | 4% borax plus 2% Krylon | 1.67 |
| | 4% CuSO$_4$.5H$_2$O plus 2% Krylon | 4.64 |
| 4 | None | 6.54 |
| | 4% borax plus 1% wax (melt) | .83 |
| | 4% borax plus 2% wax (melt) | 1.50 |
| | 4% borax plus 4% wax (melt) | 1.24 |
| | 4% borax plus 2% wax (coat) | .38 |
| | 4% borax plus 4% wax (coat) | .38 |
| 5 | None | 5.03 |
| | 4% borax plus 1% white oil (Marcol) | .20 |
| | 4% borax plus 1% ODA | .35 |
| | 4% borax plus .75% Marcol plus .25% ODA | .33 |
| | 4% borax plus .5% Marcol plus .5% ODA | .37 |
| | 4% borax | .65 |

EXAMPLE 6

In this example, urease-inhibited urea fertilizer was prepared in different ways: (1) milling urea with the additives and breaking the resulting solidified mass into particles in the laboratory; (2) commercially prepared prills; (3) spherodized urea. Volatilization losses were determined at the end of a 14 day period. The results obtained with the various preparations are shown below in Table X.

TABLE X.—LABORATORY VOLATILIZATION LOSSES OF INHIBITED UREA PREPARED IN DIFFERENT FORMS [1]

[Preparation of urea with 4% borax and 1% ODA]

| Source or method of preparation: | Relative amount of NH$_3$ lost [2] |
|---|---|
| Spherodization in conventional equipment | 46.3 |
| Melting in the laboratory | 62.7 |
| Commercial prills | 79.5 |

The results of this example shows that volatilization was reduced regardless of the method of preparation of the fertilizer employed.

[1] Each preparation tested separately in the laboratory against untreated urea.
[2] Percent of untreated urea.

EXAMPLE 7

In this example, inhibited urea formulations were tested in the field to determine their efficiency under a variety of conditions (soils, crops, climate). In all cases the formulations were compared with conventional urea; both were applied in the surface of the soil. Table XI records the yields obtained with urea containing 4.1% borax and 1% ODA, in relation to those obtained with straight urea.

TABLE XI.—RESULTS OF FIELD EXPERIMENT WITH UREASE-INHIBITED UREA

| Type of grass crop | Location | Yield with inhibited urea vs. percent of Yield with urea |
|---|---|---|
| Bluegrass | New Jersey | 1.01 |
| St. Augustine | Florida | 1.03 |
| Tall Fescue | France | 1.14 |
| Bermuda Grass | California | 1.15 |
| St. Augustine | Florida | 1.21 |
| Zoysia | do | 1.23 |
| Bermuda Grass | Arizona | 1.27 |
| Tall Fescue | New Jersey | 1.32 |
| Do | do | 1.57 |
| Do | do | 1.66 |

It is well known in the art that volatilization losses from urea are less serious under one or several of the following conditions: high clay content, high cation exchange capacity, low pH, soil remaining wet or dry, application of urea at 2″ depth, temperature below 45°.

The above results show that the combination of inhibitors is effective in reducing losses regardless of other facts, when losses are likely to occur.

EXAMPLE 8.—EFFECTIVENESS OF ODA AND OTHER HYDROPHOBIC CHEMICALS ARE RELATED TO THEIR HYDROPHOBIC NATURE

Several materials were tested in the volatilization units as defined in Example 1 to determine if the effectiveness of ODA was due to its amine radical or to its hydrophobic nature. ODA was compared with other amines, some of which were hydrophilic, and with nonamine hydrophobic and hydrophilic chemicals. All were applied at 1% by weight. The results are shown in Table XII below.

TABLE XII

| Additive | Nature | Relative amount [1] of NH₃ loss from borated ureas | |
|---|---|---|---|
| | | 3 days | 14 days |
| 0 | | 22 | 75 |
| Duareen-T [2] | Amine-hydrophobic | 7 | 58 |
| Armeen residue [3] | do | 5 | 58 |
| ODA | do | 4 | 60 |
| Marcol 72 | Nonamine-hydrophobic | 7 | 70 |
| n-Butyl amine | Amine-hydrophilic | 14 | 73 |
| Natrosol 250 [4] | Nonamine-hydrophilic | 21 | 81 |

[1] Percent of untreated urea prills.
[2] Duareen-T=N-tallow trimethylene diamine.
[3] Armeen residue=RNH₂.
[4] Natrosol 250=hydroxyethyl cellulose.

All hydrophobic amines were effective in reducing the ammonia loss of borax treated urea. The hydrophilic amine and the hydrophobic non-amine were less effective. The hydrophilic non-amine was ineffective.

EXAMPLE 9.—EFFECTIVENESS OF ODA TREATED UREA DEPENDENT ON AMOUNT BUT NOT SOURCE OF BORON

In this example, effects of various rates and sources of boron were studied in the laboratory volatilization units of Example 1 with the following results shown in Table XIII below.

TABLE XIII

| Source | Rate (percent boron) | Percent NH₃ lost | |
|---|---|---|---|
| | | 3 days | 14 days |
| | 0 | 100 | 100 |
| $Na_2B_4O_7 \cdot H_2O_1$ | .23 | 45 | 74 |
| $B_2O_3$ | .31 | 33 | 73 |
| $H_3BO_3$ | .35 | 27 | 74 |
| $Na_2B_4O_7 \cdot H_2O_1$ | .45 | 22 | 73 |
| $B_2O_3$ | .62 | 8 | 66 |
| $H_3BO_3$ | .70 | 8 | 68 |
| $B_2O_3$ | 1.24 | 5 | 61 |
| | Rate increase | Loss decrease | |

From the foregoing data, it can be seen that increasing the percent boron decreased the amount of ammonia lost by volatilization regardless of the source. Since borax is the cheapest source of boron, it is the preferred boron source of this invention.

EXAMPLE 10.—EFFECTIVENESS OF UREA TREATED WITH VARYING PROPORTIONS OF BORAX AND HYDROPHOBIC CHEMICALS

A number of hydrophobic chemicals were selected to represent the various classes and sub-classes listed in cols. 2–3. Inhibited urea formulations were prepared by mixing various proportions of borax and hydrophobic chemical into molten urea, cooling, breaking into granules, and retaining the particles in the −8 +12 mesh size. For each hydrophobic chemical various formulations were prepared with the proportions of the additives following a statistical central composite rotatable design. (In the case of the plastic coating, urea-borax prills were coated by spraying with acrylic plastic solution, and the proportions of borax and plastic followed a factorial design.)

A statistical central composite rotatable design was used because it enables one to compare several levels of additives with a minimum of experiments. Five levels each of borax and hydrophobic chemical were tested in nine combinations. A factorial design would have required 25 combinations, or 250 nonreplicated combinations for the 10 hydrophobic chemicals.

The statistical central composite design also makes it possible to fit response surfaces to describe the effect of additives on urea volatilization. This is posisble when the treatment effects reach statistical significance. In the volatilization experiments, each combination was tested only once, but a measure of the statistical variation was obtained by replication of one of the combinations (4 replications of the "center" combination). This can be done because rotatability results in uniform standard error for all the combinations.

Statistical analyses were made on IBM 7094 computer using a stepwise regression method.

Volatilization tests were conducted following the procedure outlined in Example 1, and their results are shown below in Tables XIV to XXIII.

Figure 2:
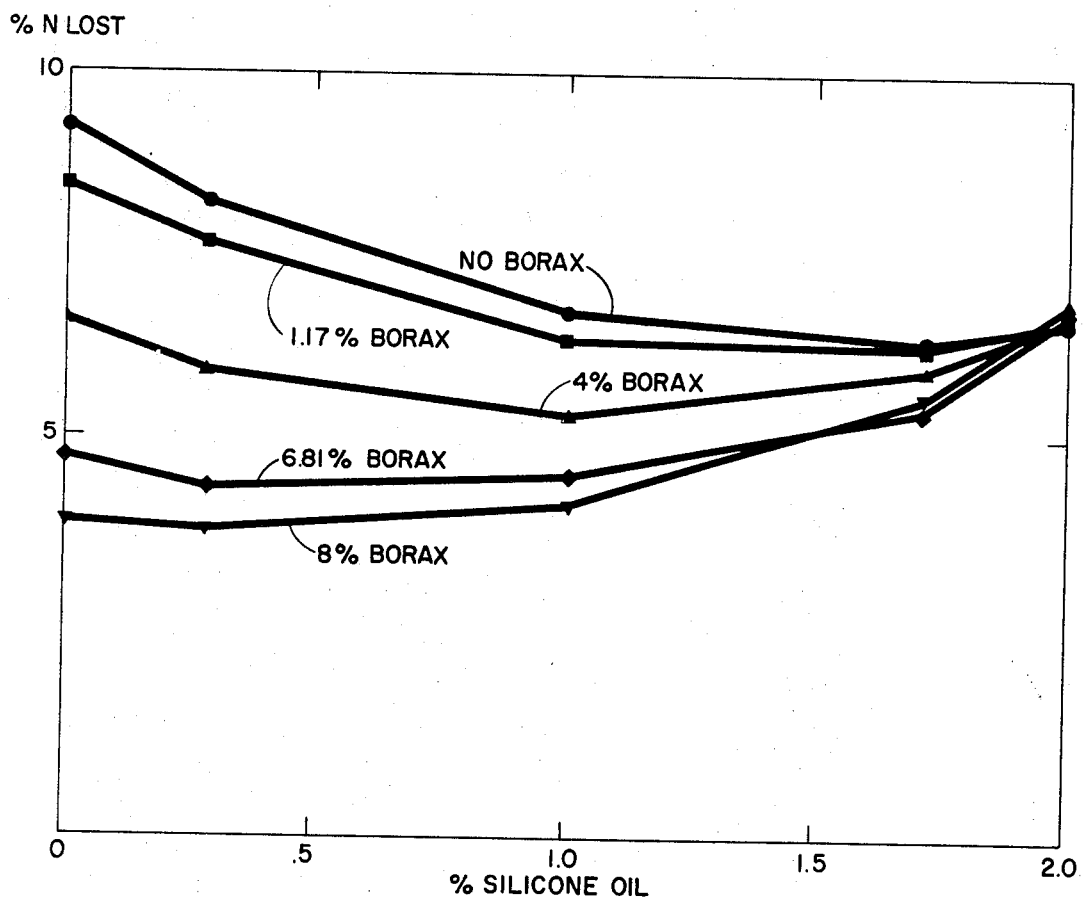
Figure 3:
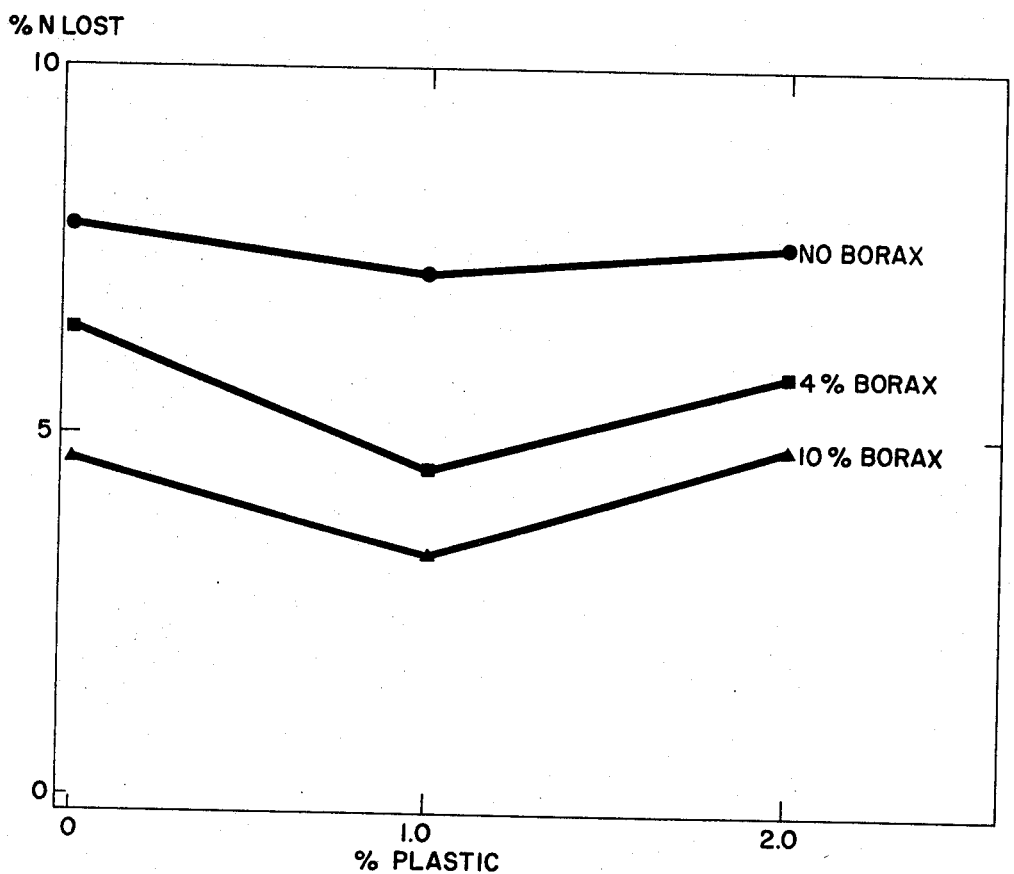

The data for Tables XXII and XXIII, showing the effects on volatilization losses of the combinations borax-silicon oil and borax-plastic are shown graphically in FIGS. 2 and 3, respectively.

The results in Tables XIV to XXIII show that borax-hydrophobic chemical combinations were more effective in reducing ammonia losses than the borax additive alone. In the tables the "center point" corresponds to 4% borax and 1% hydrophobic chemical, and is the average of 4 replications.

With occasional exceptions, volatilization was reduced when the borax concentration increased from 0 to 8% and the hydrophobic concentration from 0 to 2% (8% in the case of wax).

With 1.17% borax some of the hydrophobic chemicals did not reduce volatilization when .3 and 1.7% concentrations are compared. These cases suggest that a number of hydrophobic chemicals are effective only at borax concentrations of 4% or higher and that hydrophobic chemicals were most effective when combined with 4% borax which is therefore the minimum preferred concentration.

In some cases the 1.7% hydrophobic chemical level was no better than the .3% level when both were combined with 6.81% borax. This indicates that the 1.7% level is above the optimum in these cases. This is well illustrated by the curves in FIG. 3 for silicone oil. Depending on the borax concentrations the preferred silicone level ranges from 0.5 to 1%.

Thus borax and the hydrophobic chemical-borax combination behave differently: borax has a linear depressing effect on volatilization, that is, volatilization losses are reduced in proportion to the borax levels. In the case of hydrophobic chemicals there is a "quadratic"

effect, that is, there is an optimum concentration, which depends on the chemical and cannot be predicted.

This optimum may be explained by the limited miscibility of urea and the hydrophobic chemicals; since, as the proportion of the latter is increased, it separates from urea.

Table XXIII for plastic shows that 1% plastic was more effective than 2%.

Thus for most hydrophobic chemicals, the preferred concentration ranges from 0.3 to 1.7%. The preferred borax concentration is about 4%. Higher borax levels are not desirable because of economic limitations and possible toxic effect to crops.

TABLE IXV.—EFFECT OF BORAX AND PHILAD SL 69292 ON VOLATILIZATION LOSSES—4 DAYS

| | Percent borax | | | | |
|---|---|---|---|---|---|
| | 0 | 1.17 | 4.00 | 6.81 | 8.00 |
| Philad SL 69292:[1] | | | | | |
| 0 | | | | 6.50 | |
| .3 | | 7.81 | | 6.20 | |
| 1.0 | 6.26 | | 5.71 | | 2.47 |
| 1.7 | | 9.09 | | 5.23 | |
| 2.0 | | | 5.27 | | |

[1] Calcium getroleum sulfonate, M.W. of sulfonate 900–1000,.

NOTE.—Borax-hydrophobic chemical combinations follow a central composite rotatable design.

TABLE XV.—EFFECT OF BORAX AND DUOMEEN T ON VOLATILIZATION LOSSES—4 DAYS

| | Percent borax | | | | |
|---|---|---|---|---|---|
| | 0 | 1.17 | 4.00 | 6.81 | 8.00 |
| Percent Duomeen T:[1] | | | | | |
| 0 | | | | 6.14 | |
| .3 | | 9.03 | | 5.36 | |
| 1.0 | 6.20 | | 5.55 | | 4.00 |
| 1.7 | | 7.52 | | 4.34 | |
| 2.0 | | | 4.46 | | |

[1] N-tallow trimethylene diamine.

NOTE.—Borax-hydrophobic chemical combinations follow a central composite rotatable design.

TABLE XVI.—EFFECT OF BORAX AND BRIJ 92 ON VOLATILIZATION LOSSES—4 DAYS

| | Percent borax | | | | |
|---|---|---|---|---|---|
| | 0 | 1.17 | 4.00 | 6.81 | 8.00 |
| Percent BRIJ 92:[1] | | | | | |
| 0 | | | | 6.78 | |
| .3 | | 8.94 | | 5.88 | |
| 1.0 | 5.88 | | 6.52 | | 5.19 |
| 1.7 | | 12.60 | | 5.49 | |
| 2.0 | | | 5.64 | | |

[1] Oleyl ether of polyethylene glycol.

NOTE.—Borax-hydrophobic chemical combinations follow a central composite rotatable design.

TABLE XVII.—EFFECT OF BORAX AND SODIUM ALKYL BENZENE SULFONATE ON VOLATILIZATION LOSSES—4 DAYS

| | Percent borax | | | | |
|---|---|---|---|---|---|
| | 0 | 1.17 | 4.00 | 6.81 | 8.00 |
| Percent sodium alkyl benzene sulfonate: | | | | | |
| 0 | | | | 7.62 | |
| .3 | | 9.45 | | 5.46 | |
| 1.0 | 5.88 | | 6.59 | | 5.34 |
| 1.7 | | 8.74 | | 5.82 | |
| 2.0 | | | 5.49 | | |

NOTE.—Borax-hydrophobic chemical combinations follow a central composite rotatable design.

TABLE XVIII.—EFFECT OF BORAX AND WAX ON VOLATILIZATION LOSSES—4 DAYS

| | Percent borax | | | | |
|---|---|---|---|---|---|
| | 0 | 1.17 | 4.00 | 6.81 | 8.00 |
| Percent Wax 1750:[1] | | | | | |
| 0 | | | | 5.94 | |
| 1.17 | | 9.42 | | 3.43 | |
| 4.00 | 4.80 | | 4.76 | | 3.18 |
| 6.81 | | 5.94 | | 5.12 | |
| 8.00 | | | 4.50 | | |

[1] Mikrovan 1750, a microcrystalline wax, M.P. 160° F., viscosity 211 cs. at 210° F., 33.8 cs. at 180° F.

NOTE.—Borax-hydrophobic chemical combinations follow a central composite rotatable design.

TABLE XIX.—EFFECT OF BORAX AND SPRAY OIL ON VOLATILIZATION LOSSES—4 DAYS

| | Percent borax | | | | |
|---|---|---|---|---|---|
| | 0 | 1.17 | 4.00 | 6.81 | 8.00 |
| Percent spray oil:[1] | | | | | |
| 0 | | | | 6.09 | |
| .3 | | 7.95 | | 4.17 | |
| 1.0 | 7.26 | | 5.36 | | 3.30 |
| 1.7 | | 9.60 | | 5.58 | |
| 2.0 | | | 4.29 | | |

[1] "Orchex 792"—a naphthenic spray oil, viscosity 70 SUS at 100° F., min. V.R. of 52.

NOTE.—Borax-hydrophobic chemical combinations follow a central composite rotatable design.

TABLE XX.—EFFECT OF BORAX AND VEGETABLE OIL ON VOLATILIZATION LOSSES—4 DAYS

| | Percent borax | | | | |
|---|---|---|---|---|---|
| | 0 | 1.17 | 4.00 | 6.83 | 8.00 |
| Percent olive oil:[1] | | | | | |
| 0 | | | | 7.38 | |
| .3 | | 9.30 | | 3.39 | |
| 1.0 | 6.78 | | 5.18 | | 2.82 |
| 1.7 | | 7.08 | | 2.10 | |
| 2.0 | | | 5.22 | | |

[1] Commercial unadulterated olive oil.

NOTE.—Borax-hydrophobic chemical combinations follow a central composite rotatable design.

TABLE XXI.—EFFECT OF BORAX AND OCTADECYLAMINE ON VOLATILIZATION LOSSES—4 DAYS

| | Percent borax | | | | |
|---|---|---|---|---|---|
| | 0 | 1.17 | 4.00 | 6.81 | 8.00 |
| Percent octadecylamine:[1] | | | | | |
| 0 | | | | 6.30 | |
| .41 | | 7.02 | | 2.75 | |
| 1.41 | 8.40 | | 5.82 | | 3.08 |
| 2.41 | | 5.20 | | 4.03 | |
| 2.83 | | | 4.26 | | |

NOTE.—Borax-hydrophobic chemical combinations follow a central composite rotatable design.

TABLE XXII.—EFFECT OF BORAX AND SILICONE OIL ON VOLATILIZATION LOSSES—4 DAYS

| | Percent borax | | | | |
|---|---|---|---|---|---|
| | 0 | 1.17 | 4.00 | 6.83 | 8.00 |
| Percent silicone oil:[1] | | | | | |
| 0 | | | | 7.28 | |
| .3 | | 7.40 | | 4.15 | |
| 1.0 | 6.14 | | 5.54 | | 3.61 |
| 1.7 | | 6.68 | | 6.14 | |
| 2.0 | | | 5.54 | | |

[1] Dow 510 fluid—low phenyl dimethyl polysiloxane.

NOTE.—Borax-hydrophobic chemical combinations follow a central composite rotatable design.

TABLE XXIII.—EFFECT OF BORAX AND PLASTIC ON VOLATILIZATION LOSSES—4 DAYS

| | Percent borax | | |
|---|---|---|---|
| | 0 | 4 | 10 |
| Percent plastic:[1] | | | |
| 0 | 7.80 | 6.45 | 4.68 |
| 1 | 7.20 | 4.50 | 3.36 |
| 2 | 7.52 | 5.88 | 4.80 |

[1] From "Krylon"—a commercial 6% acrylic plastic solution in toluene;

NOTE.—Borax-plastic combinations follow a factorial design.

APPENDIX

Specifications of materials used in Examples 1–10

Borax: $Na_2B_4O_7 \cdot 10H_2O$, reagent grade, ACS.

ODA: Octadecylamine (practical grade)

$$CH_3(CH_2)_{17}NH_2$$

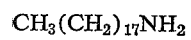

M.P. 47–51° C. Screened through 80 mesh sieve.

Marcol 72: A National Formulary grade white oil, mixed naphthenic/paraffinic based, viscosity 72 SUS at 100° F., 36 SUS at 210° F., specific gravity of 0.859 at 77° F.

Orchex 792: Spray Oil C, a naphthenic spray oil, viscosity 70 SUS at 100° F., minimum U.R. of 52.

Necton 37: Faxam 40, a straight paraffinic process oil, viscosity 113 SUS at 100° F., 40 SUS at 210° F.

Copper Sulfate: $CaSO_4 \cdot 5H_2O$, reagent grade, ACS.

Ammonium Fluoride: $NH_4F$ crystal reagent, 94.0% $NH_4F$.

Thiourea: $(NH_2)_2CS$ reagent, 0.1% residue after ignition.

Formaldehyde: Minimum 37% HCHO in water, containing 10–15% $CH_3OH$ as preservative.

Acetaldehyde: $CH_3CHO$ reagent, B.P. 20–20°.

p-Tolualdehyde: Practical grade, practical B.P. 79–81° C. at 10 mm. $CH_3C_6H_4CHO$.

1-Naphthaldehyde: $C_{10}H_7CHO$, B.P. 156–159°/14 mm.

Silicone: Dimethyl polysiloxane sold by General Electric as Silicone Oil SF–96 (350).

Olive oil: Commercial unadulterated olive oil whose chief constituent is glyceryl trioleate with a melting point of −6° C. Because of variations among commercial sources of olive oil, the experiments described in Tables XVII and XX cannot be reproduced exactly, but similar trends should be observed.

Krylon No. 1301: A commercial 6% acrylic plastic solution in toluene, made by Borden Chemical Company.

Wax: Mikrovan 1750, a microcrystalline wax melting point 160° F., viscosity 211 cs. at 210° F., 33.8 cs. at 180° F.

Duameen T: N-tallow trimethylene diamine of the formula:

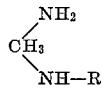

Armeen residue: $RNH_2$.

n-Butyl amine: $CH_3(CH_2)_3NH_2$, B.P. 76–78°.

Natrosol 250: Hydroxyethylcellulose.

Primol 355: A USP grade white oil, viscosity 360 SUS at 100° F., 54 SUS at 210° F. Specific gravity 0.879 at 77° F., primarily of naphthenic origin.

Boric Acid: $H_3BO_3$ reagent grade.

Boron Oxide: $B_2O_3$ reagent grade.

Philad SL 69292: Calcium petroleum sulfonate, M.W. of sulfonate 900–1000.

Silicone Oil: Low phenyl dimethyl polysiloxane sold by Dow Chemical Company under the trade name of Dow 510 fluid silicone.

BRIJ 92: Oleyl ether of polyethylene glycol; a hydroprobic chemical with a nonionic polar group.

Acetaldehyde: $CH_3CHO$, B.P. 20–20°.

p-Tolualdehyde: Practical grade, $CH_3C_6H_4CHO$, B.P. 79°, 81° C./10 mm.

1-Naphthaldehyde: $C_{10}H_7CHO$, B.P. 156°–159°/14 mm.

What is claimed is:

1. An improved urea fertilizer composition, comprising in combination a major amount of urea; a urease inhibitor consisting of either a metal borate or boric acid, said inhibitor being present in an amount ranging from 4 to 8% by weight based upon the weight of urea contained in the composition, the improvement or combination therewith of a hydrophobic substance, said hydrophobic substance being one selected from the group consisting essentially of a microcrystalline wax having a melting point of 160° F. and a viscosity of 211 cs. at 210° F. and of 33.8 cs. at 180° F., an oleyl ether of polyethyleneglycol, N-tallow trimethylene diamine, calcium petroleum sulfonate, a naphthenic spray oil having a viscosity of 70 S.U.S. at 100° F., olive oil, octadecylamine and dimethyl polysiloxane, said hydrophobic substance being incorporated into said urea fertilizer in an amount ranging from 0.1 to 2.0% by weight based upon the total weight of the urea, said urease inhibitor and said hydrophobic substance being uniformly distributed throughout said fertilizer composition, each present in sufficient amount within the ranges stated hereinabove to inhibit the rapid volatilization of ammonia therefrom.

2. A fertilizer composition according to claim 1, wherein octadecyl amine and sodium tetraborate are coated onto a pellet of urea.

References Cited

UNITED STATES PATENTS

| | | | |
|---|---|---|---|
| 3,202,501 | 8/1965 | Pettersson et al. | 71—28 |
| 3,223,518 | 12/1965 | Hansen | 71—28X |
| 3,232,740 | 2/1966 | Sor et al. | 71—28 |
| 3,234,003 | 2/1966 | Sawyer et al. | 71—64EX |
| 3,388,989 | 6/1968 | Sor | 71—28 |

OTHER REFERENCES

Sumner et al. "Chemistry and Methods of Enzymes," third edition, 1953, page 159, Academic Press Inc., New York, N.Y.

Hackh's Chemical Dictionary, third edition, 1944, page 425, The Blakiston Company, Philadelphia.

Webster's Seventh New Collegiate Dictionary, 1965, page 493, G. & C. Merriam Co., Springfield, Mass.

REUBEN FRIEDMAN, Primary Examiner

B. H. LEVENSON, Assistant Examiner

U.S. Cl. X.R.

71—64